(12) United States Patent
Hagler

(10) Patent No.: US 6,762,833 B2
(45) Date of Patent: *Jul. 13, 2004

(54) METHOD AND APPARATUS FOR SPECTRUM ANALYSIS AND ENCODER

(75) Inventor: Thomas W. Hagler, Pleasanton, CA (US)

(73) Assignee: Advanced Photometrics, Inc., Grass Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/062,607

(22) Filed: Feb. 1, 2002

(65) Prior Publication Data

US 2002/0141028 A1 Oct. 3, 2002

Related U.S. Application Data

(60) Continuation of application No. 09/846,583, filed on May 1, 2001, now Pat. No. 6,388,794, which is a division of application No. 09/105,279, filed on Jun. 26, 1998, now Pat. No. 6,271,917.

(51) Int. Cl.⁷ .............................. G01J 3/04; G02B 26/02
(52) U.S. Cl. ....................... 356/310; 356/323; 356/330; 359/236; 250/339.07
(58) Field of Search ............................... 356/310, 330, 356/323; 359/5, 6, 10, 11, 236, 238; 382/211, 278, 214, 237, 250; 708/816, 821; 250/226, 339.07, 568, 555, 570; 369/112.22

(56) References Cited

U.S. PATENT DOCUMENTS

| | | | |
|---|---|---|---|
| 3,563,654 A | 2/1971 | Vermande | 356/330 |
| 3,578,980 A | 5/1971 | Decker | 250/237 G |
| 3,586,442 A | 6/1971 | Tripp | 356/331 |
| 3,636,062 A | 1/1972 | Girard | 552/12 |
| 3,640,625 A | 2/1972 | Ibbett | 356/310 |

(List continued on next page.)

FOREIGN PATENT DOCUMENTS

| | | |
|---|---|---|
| GB | 672758 A | 5/1952 |
| WO | WO 97/31245 | 8/1997 |

OTHER PUBLICATIONS

"Static Multislit Spectroscopy and Its Application to the Panoramic Display of Infrared Spectra," Marcel J.E. Golay, Journal of the Optical Society of America, vol. 41, No. 7, Jul. 1951, pp. 468–472.

"Multi–Slip Spectrometry," Marcel J.E. Golay, Journal of the Optical Society of America, vol. 39, No. 6, Jun. 1949, pp. 437–444.

"A Multiplex Grating Spectrometer," J.F. Grainger et al., Journal de Physique, Colloque C2, supplemental au No. 3–4, Tome 28, Mars–Avril 1967, pp. C2–44 –C2–52 (English).

Search Report mailed Oct. 21, 1999, filed in Ser. No 09/846,583, now U.S. Pat. 6,388,794.

International Search Report mailed Jan. 11, 2000, filed in Ser. No. 09/105,279, now U.S. Pat. 6,271,917 B1.

(List continued on next page.)

*Primary Examiner*—Evelyn Lester
(74) *Attorney, Agent, or Firm*—Parsons Hsue & de Runtz LLP

(57) ABSTRACT

A disc serving as a spatial radiation modulator has dispersed radiation filters thereon. Each filter has a transmittance or reflectance modulation function of the form $\sin^2(m\theta+p\pi/4)$, where m is a positive integer and p has one of the four values 0, 1, 2, 3. A radiation beam including selected wavelength components is diffracted into an elongated image dispersed according to wavelength. Different wavelength components are focused onto different filters on the modulator and are encoded by correspond filters. Since the modulation functions of the filters are orthogonal to one another, it is possible to extract the amplitude of each wavelength component after it has been encoded or modulated by corresponding filter from the total detected signal during one measurement.

14 Claims, 13 Drawing Sheets

U.S. PATENT DOCUMENTS

| | | | |
|---|---|---|---|
| 3,922,092 A | 11/1975 | van den Bosch | 356/332 |
| 4,007,989 A | 2/1977 | Wajda | 356/310 |
| 4,264,205 A | 4/1981 | Landa | 356/326 |
| 4,304,491 A | 12/1981 | Kraushaar | 356/326 |
| 4,448,529 A | 5/1984 | Krause | 356/310 |
| 4,450,459 A | 5/1984 | Turner | 347/239 |
| 5,024,508 A | 6/1991 | Horner | 359/561 |
| 5,090,807 A | 2/1992 | Tai | 356/310 |
| 5,121,239 A | 6/1992 | Post | 359/272 |
| 5,235,461 A | 8/1993 | Kirsch | 359/561 |
| 5,325,324 A | 6/1994 | Rentzepis | 365/127 |
| 5,483,335 A | 1/1996 | Tobias | 356/310 |
| 5,485,268 A | 1/1996 | Tobias | 356/310 |
| 5,504,575 A | 4/1996 | Stafford | 356/330 |
| 5,537,303 A | 7/1996 | Stacy | 362/284 |
| 5,579,105 A | 11/1996 | Belton | 356/310 |
| 5,592,327 A | 1/1997 | Gabl | 359/348 |
| 5,691,886 A | 11/1997 | Stacy | 362/283 |
| 5,748,308 A | 5/1998 | Lindberg | 356/310 |
| 5,991,460 A | 11/1999 | Mitchell | 382/278 |
| 6,011,640 A | 1/2000 | Hutton | 359/234 |
| 6,018,402 A | 1/2000 | Campbell | 359/22 |
| 6,101,034 A | 8/2000 | Cox et al. | 359/562 |
| 6,271,917 B1 * | 8/2001 | Hagler | 356/310 |
| 6,388,794 B2 * | 5/2002 | Hagler | 359/236 |
| 2004/0021078 A1 | 2/2004 | Hagler | 250/339.13 |

\* cited by examiner

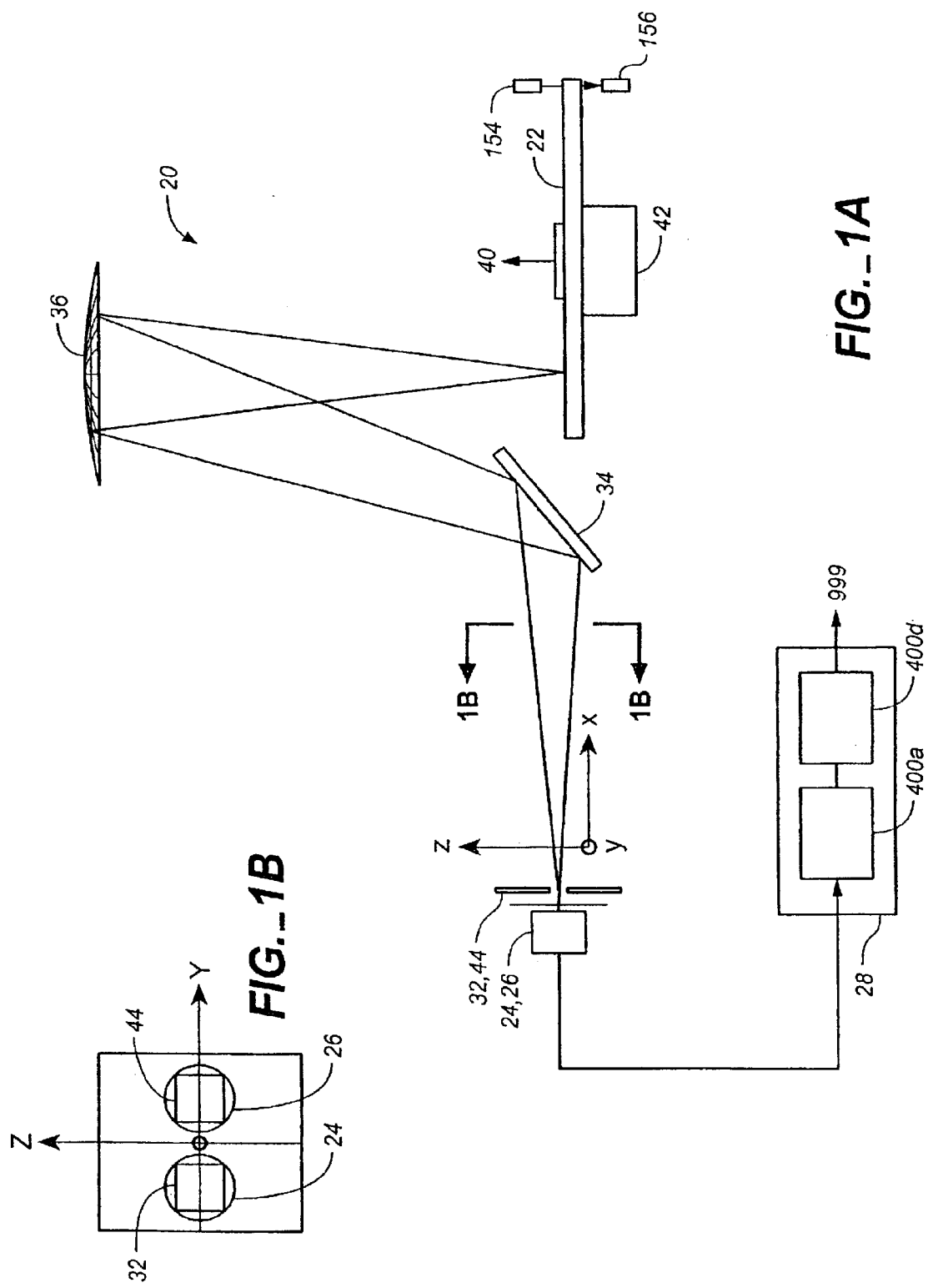

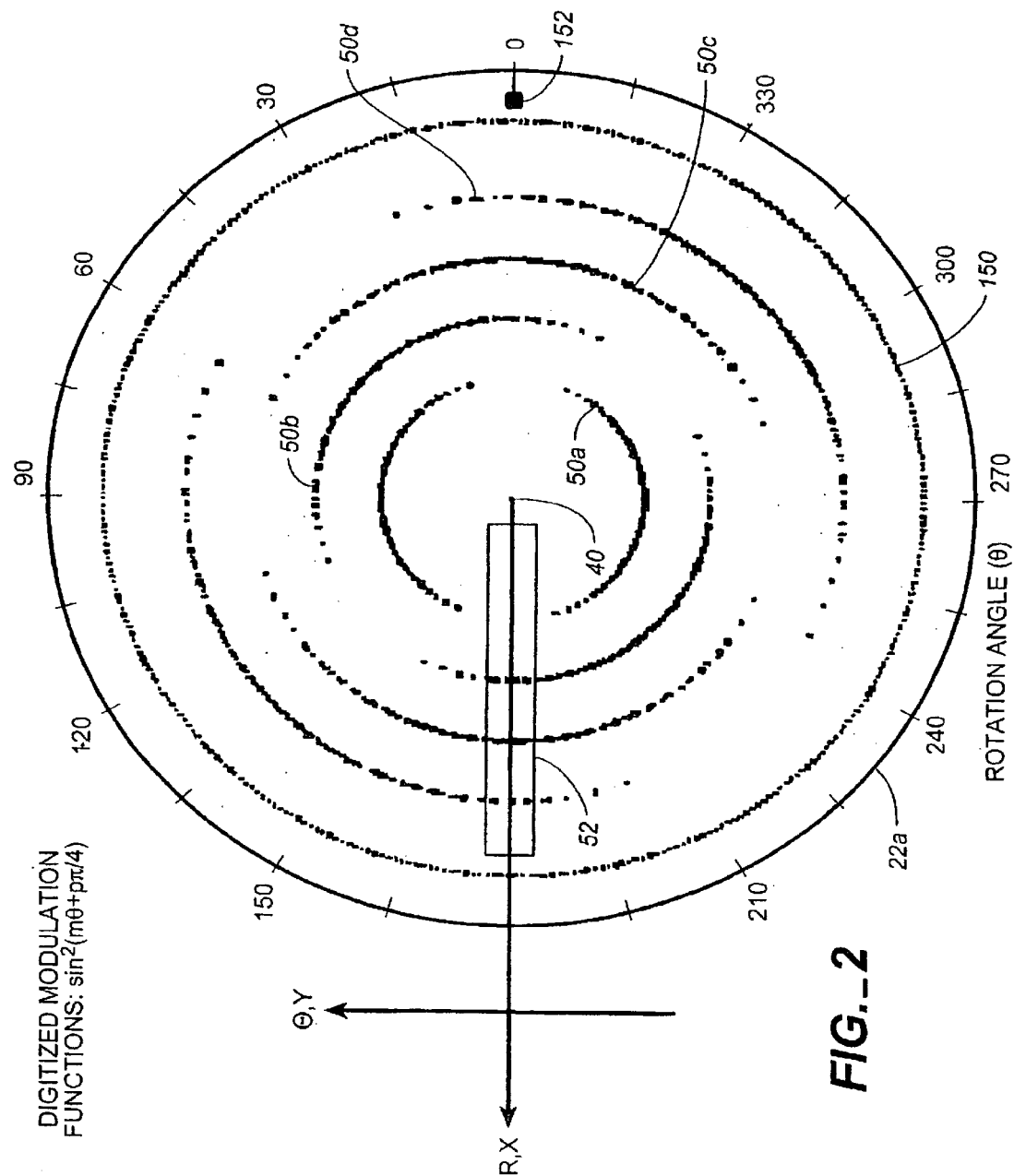
FIG._2

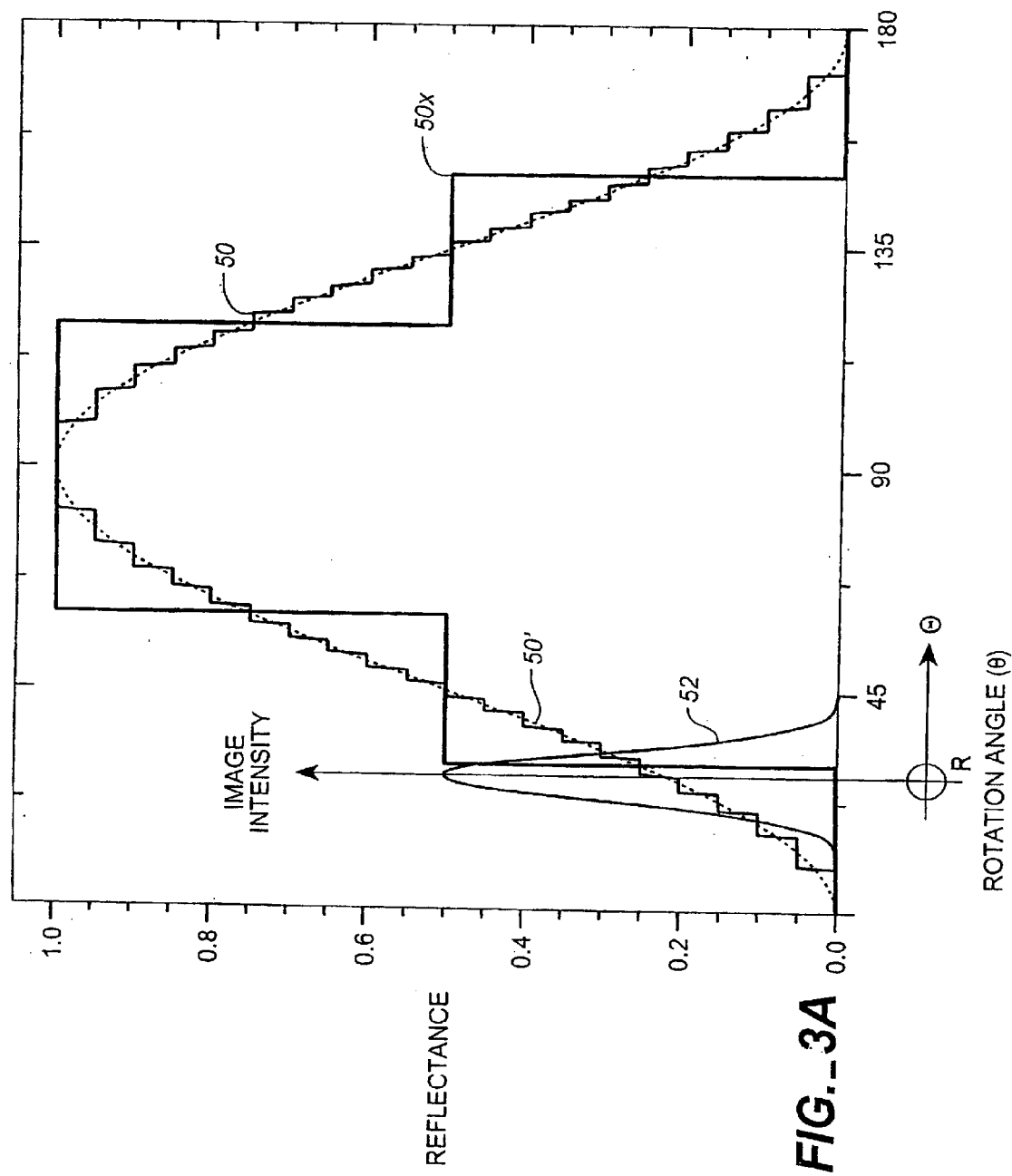
FIG._3A

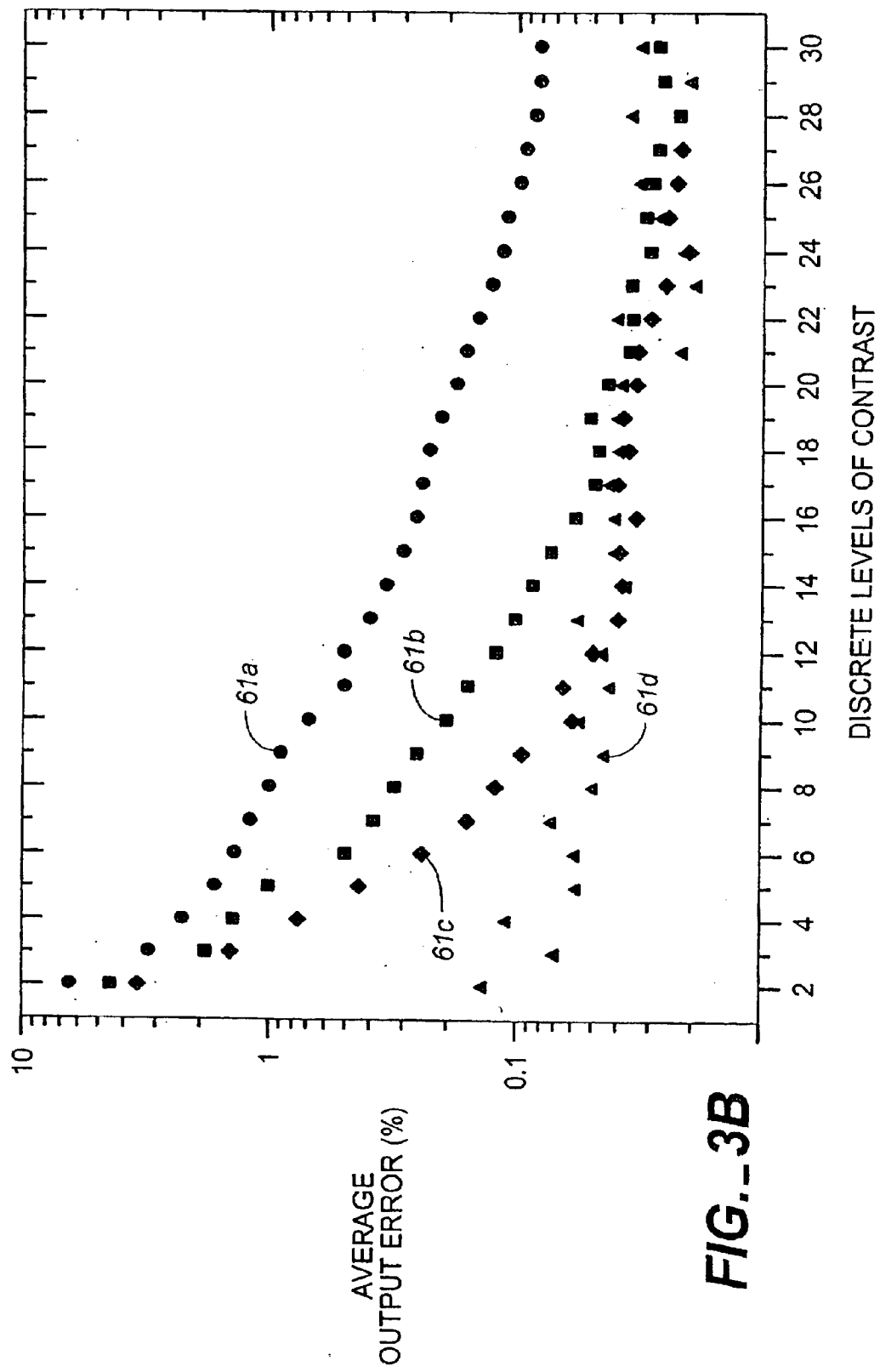
FIG._3B

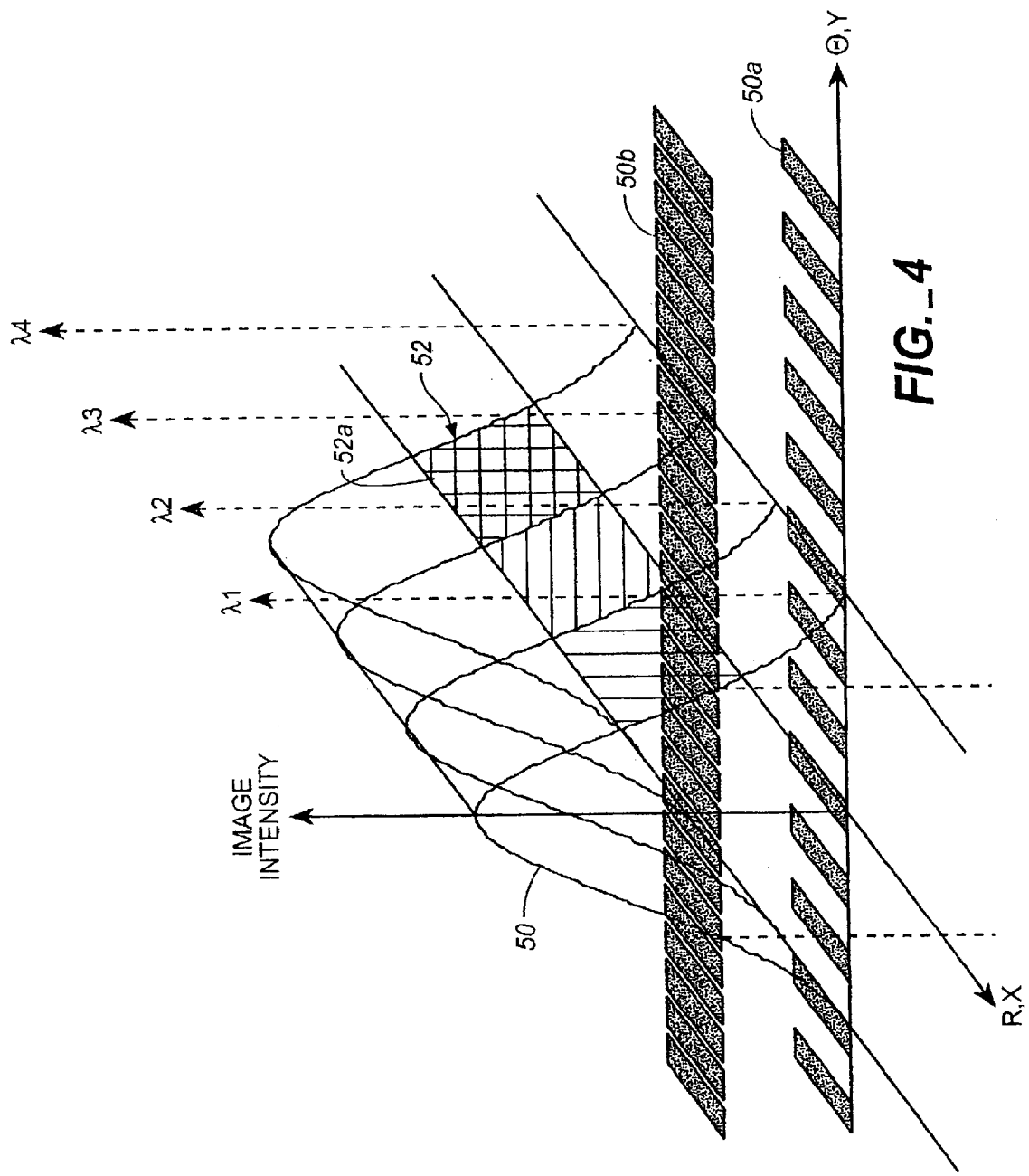
FIG._4

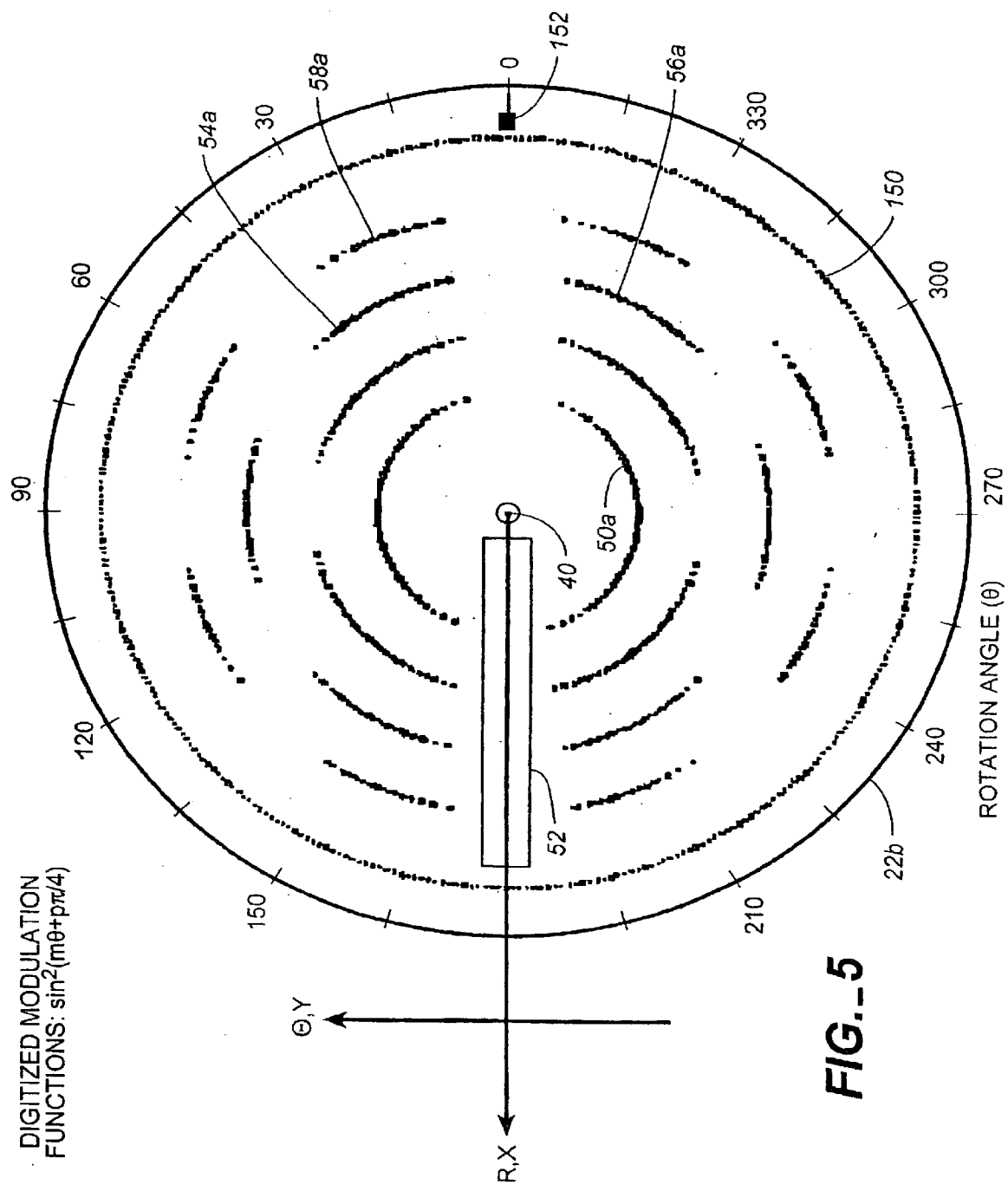
FIG._5

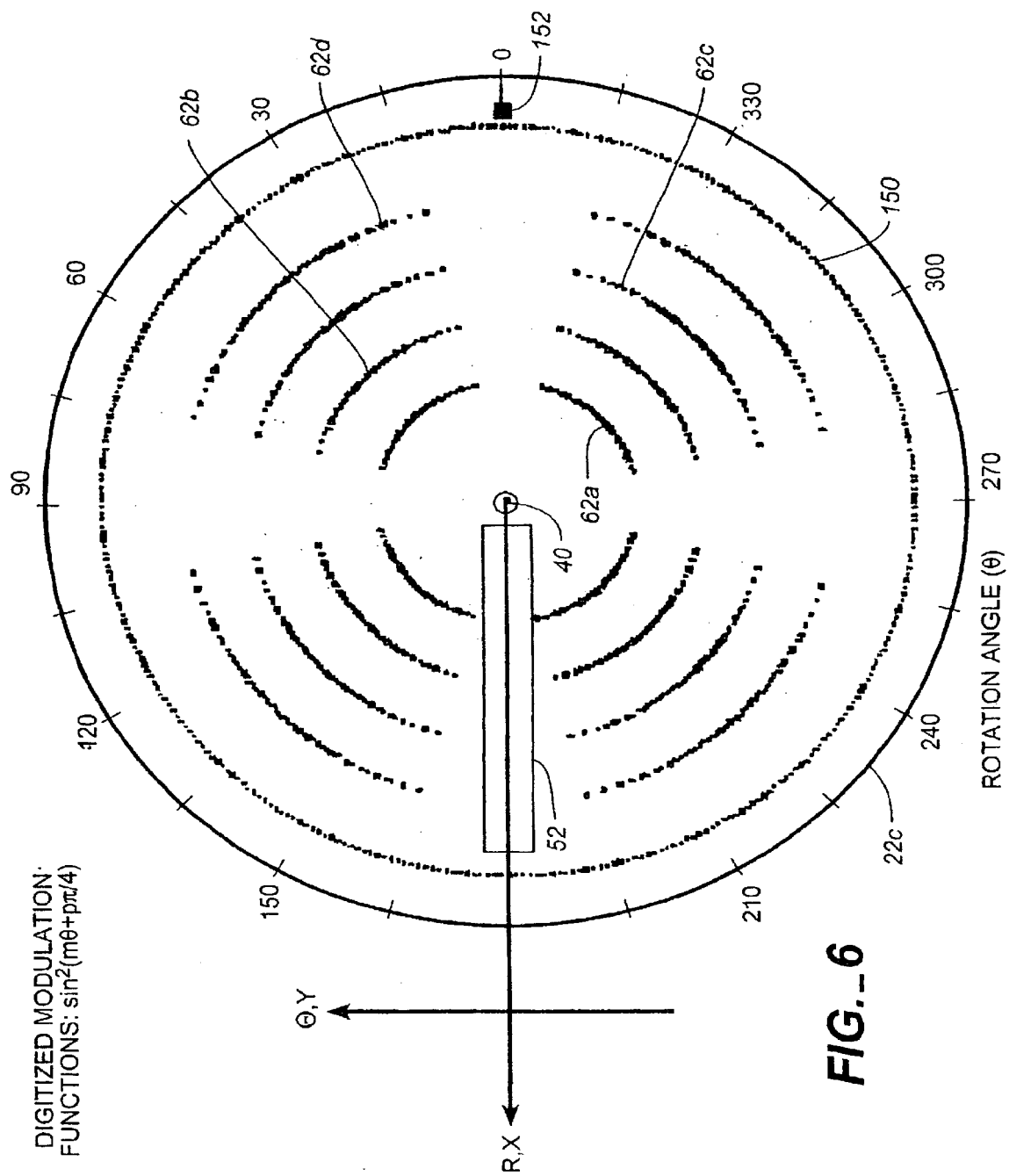
FIG._6

RADIAL MODULATION FUNCTIONS: $\sin^2(m\theta+p\pi/4)$
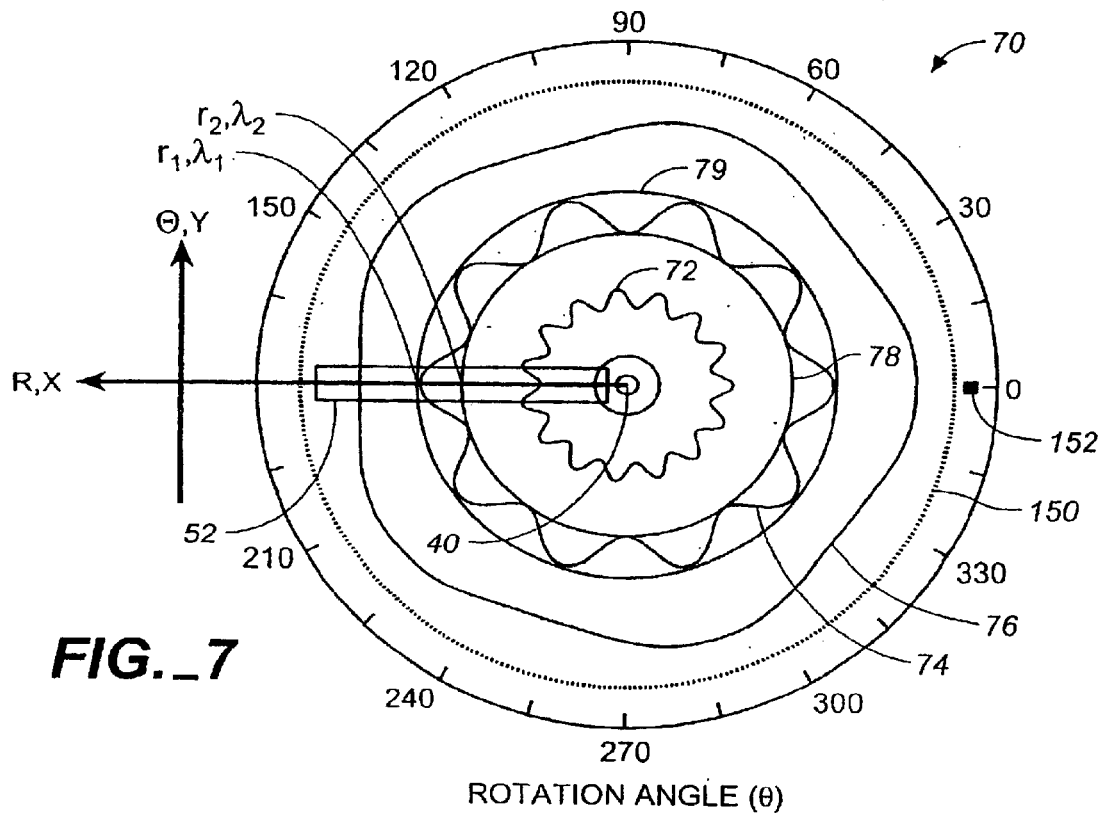
FIG._7
ROTATION ANGLE ($\theta$)
RADIAL MODULATION FUNCTIONS: $\sin^2(m\theta+p\pi/4)$
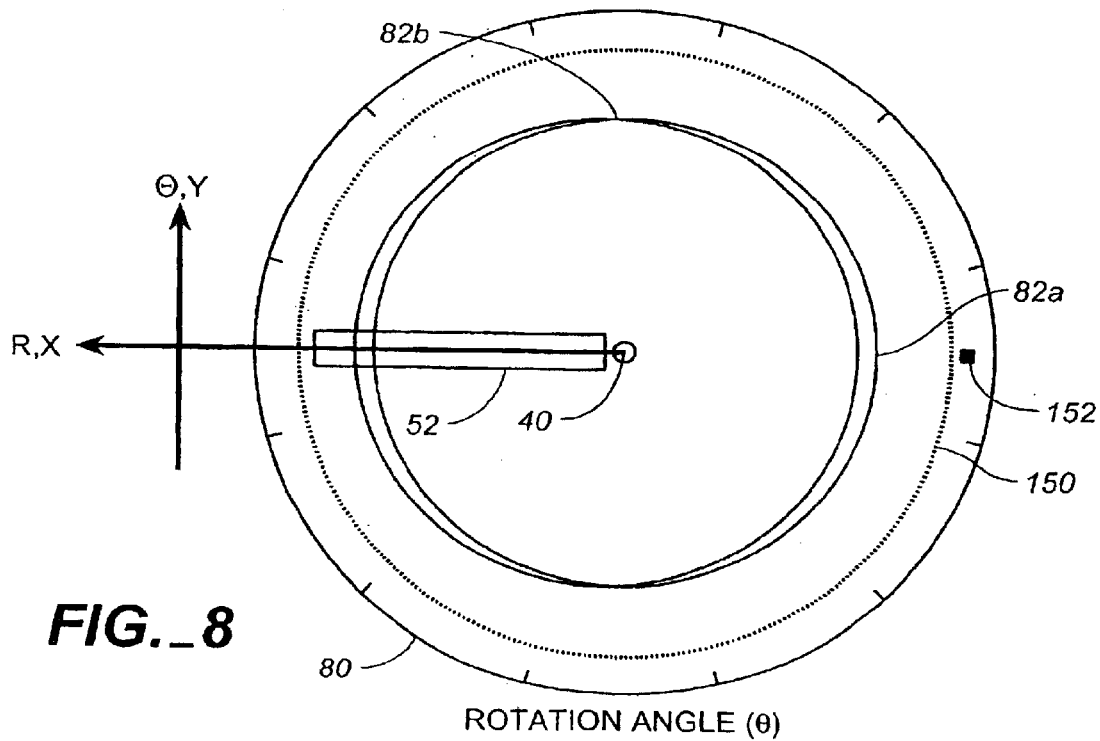
FIG._8
ROTATION ANGLE ($\theta$)

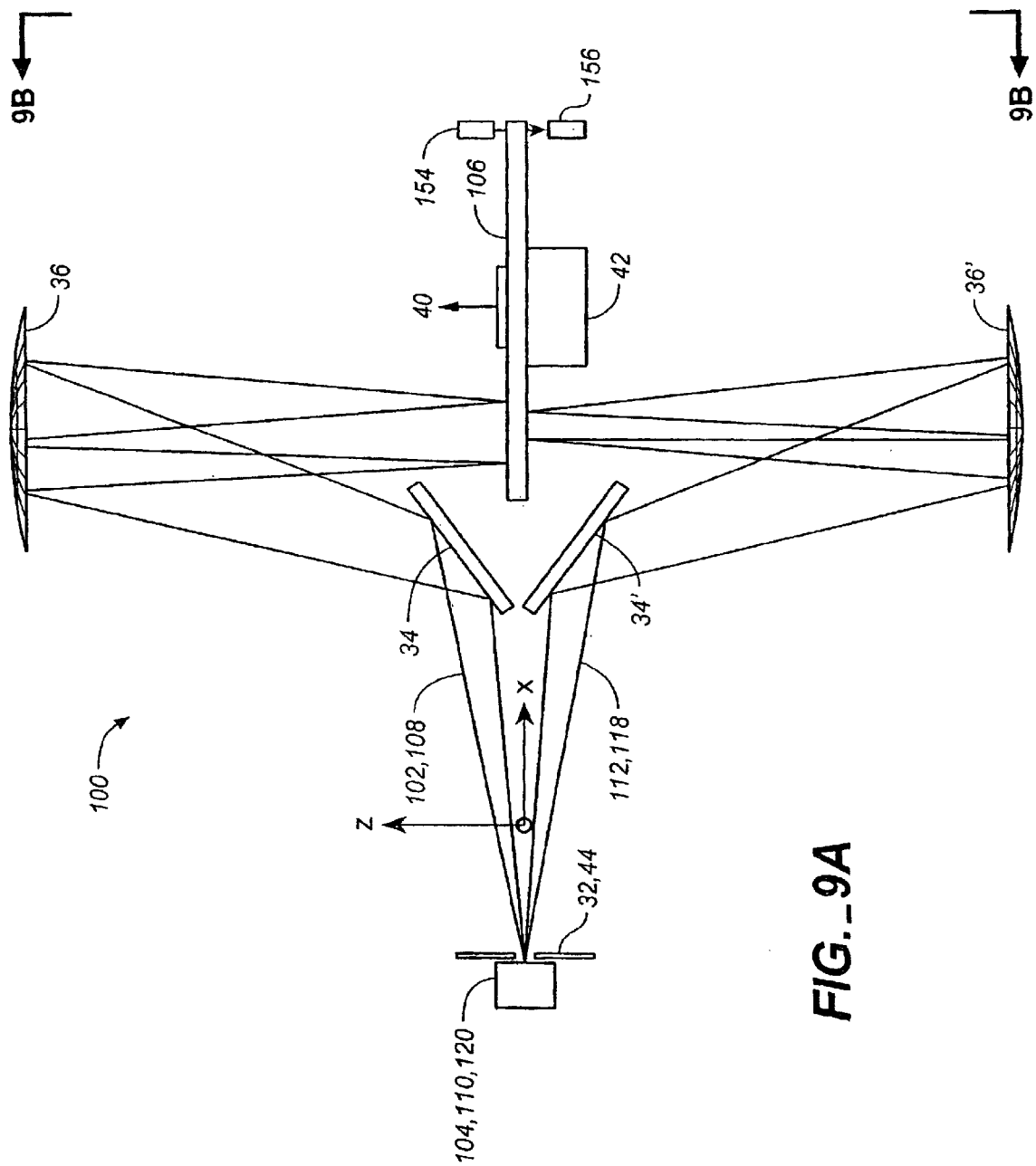
FIG._9A

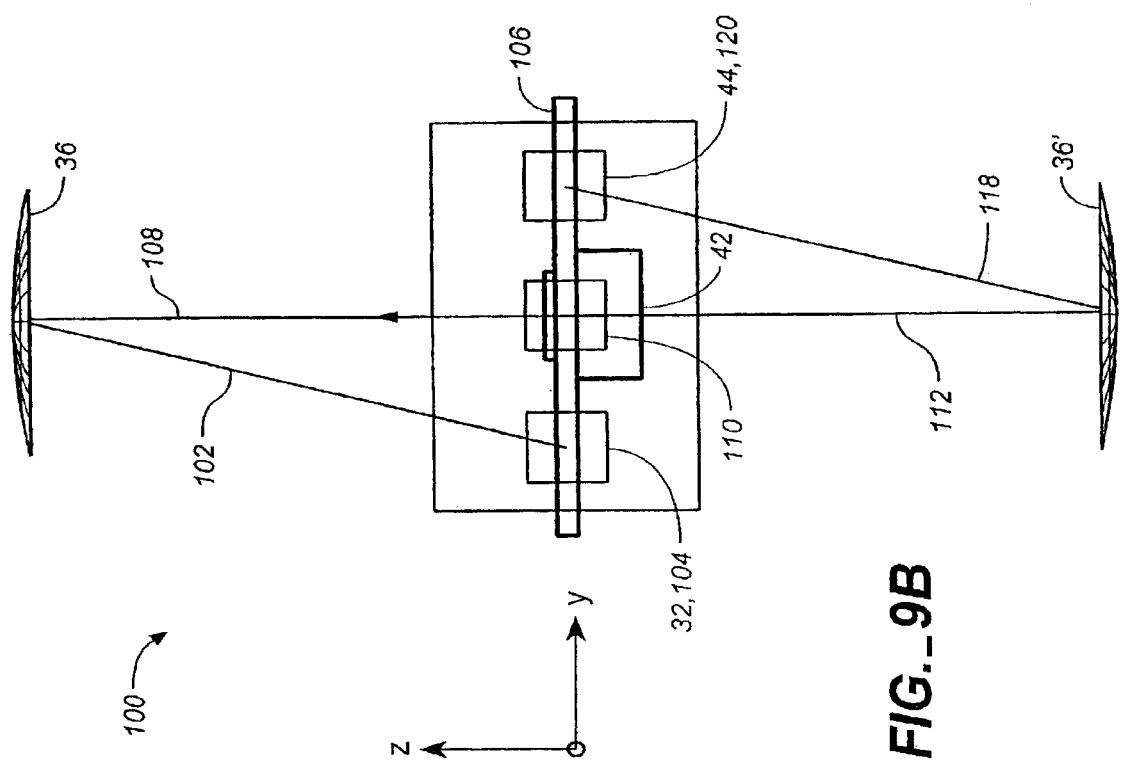
FIG._9B

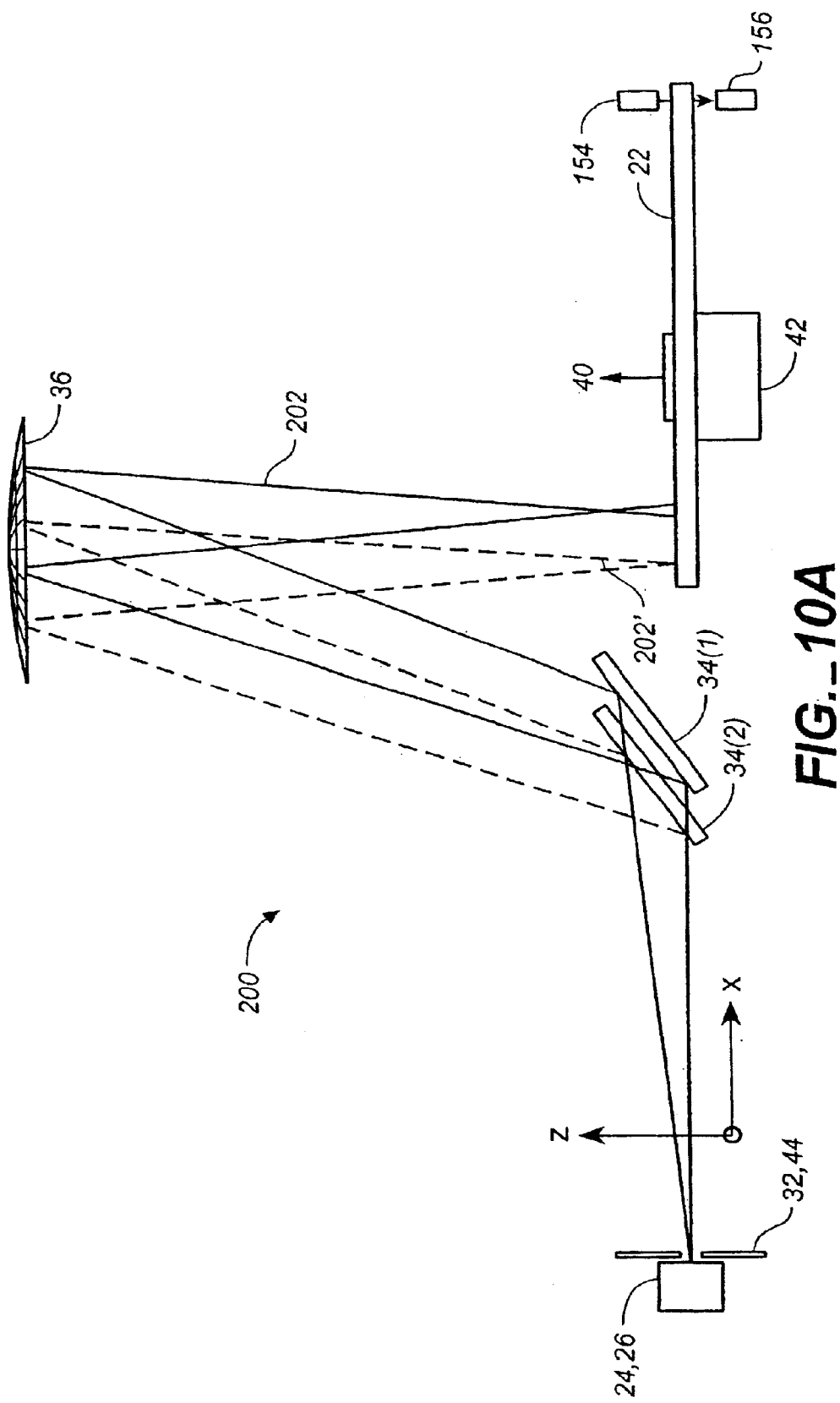
FIG._10A

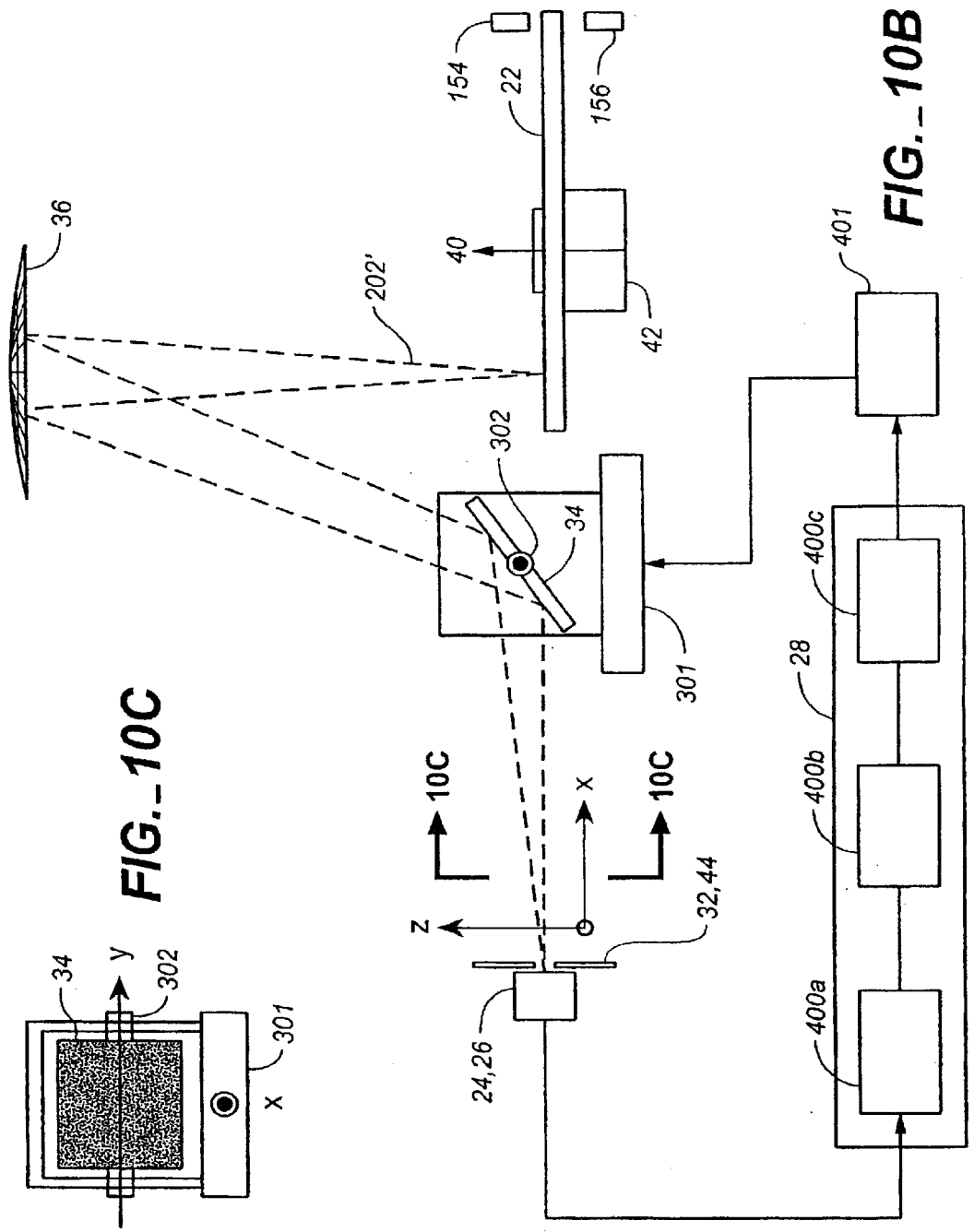

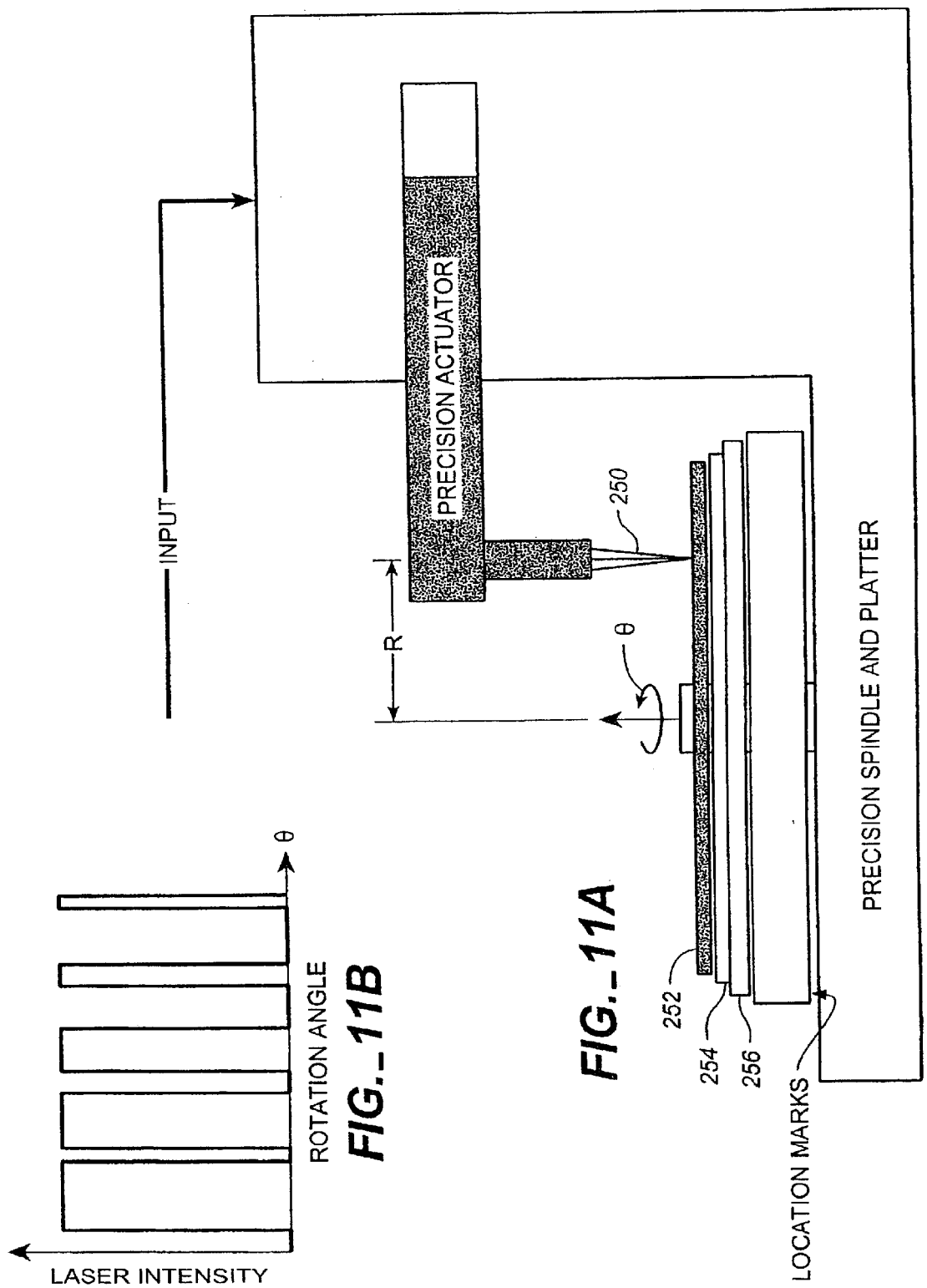

METHOD AND APPARATUS FOR SPECTRUM ANALYSIS AND ENCODER

CROSS REFERENCE TO RELATED APPLICATIONS

This application is a continuation of U.S. patent application Ser. No. 09/846,583, filed May 1, 2001, now U.S. Pat. No. 6,388,794, B2 which is a divisional application of U.S. patent application Ser. No. 09/105,279, filed Jun. 26, 1998, now U.S. Pat. No. 6,271,917.

BACKGROUND OF THE INVENTION

This invention relates in general to spectrum analyzers and in particular, to a spectrum analyzer and encoder employing spatial modulation of radiation dispersed by wavelength.

Radiation spectral analysis is presently carried out in a number of ways. Dispersive and Fourier transform based analyzers are for high resolution and can be used for many different applications so that they are more versatile than existing application-specific instruments and procedures. While these analyzers offer superior spectral performance, they tend to be expensive, slow and are not portable. For most applications, these instruments offer a resolution which is largely unnecessary. Many applications require measurements only at several wavelengths so that most of the data taken over the entire complete spectrum using these instruments is discarded and not used at all for such applications. Such analyzers may also be too large and heavy for many practical applications.

In contrast, a non-dispersive approach to spectral analysis employs interference filters of fixed frequency passbands to perform given analytical functions. To perform the measurement, the light signal containing a number of wavelength components is propagated through one or more interference filters which are characterized by a center wavelength and bandwidth. The non-dispersive approach is advantageous over the Fourier transform and dispersive spectrum analyzers in that the non-dispersive approach is cheaper and measures the minimum amount of spectral data required to perform a given analytical function. However, if the analytical function requires a significant number of filters, the system's signal-to-noise ratio is reduced as the total energy measured in a given filter over time is inversely related to the number of filters. Furthermore, if a spectrum analyzer using this approach is configured for a first application, the filters used in the device may have to be replaced, or the number of filters changed, in order to adapt the analyzer to a second application. Therefore, even though the non-dispersive approach may be cheaper and does not measure unnecessary data as compared to the dispersive and Fourier transform approaches, the present non-dispersive approach has its limitations.

Another type of optical spectrum analyzer, which is best described as a hybrid between dispersive and non-dispersive instruments, is the Hadamard spectrometer. The Hadamard spectrometer includes a spatial light modulator, comprised of a disc made of an opaque material with slots therein that reflect or transmit light, where the slots have uniform transmittance or reflectance, a technique which is generally referred to as a binary amplitude modulation or chopping. A light beam is dispersed according to wavelength onto the disc so that different wavelength components may be reflected by or transmitted through different slots. The disc is rotated about a rotation axis and the slots are selectively spaced at different radii from the axis to form a number of different channels for detecting corresponding wavelength components of the beam. The light reflected or transmitted by all of the channels are directed to the same detector. In order to differentiate the intensity of the wavelength component transmitted or reflected by a slot for one channel from that of another wavelength component for another channel, the disc is sequentially stepped through an application specific number of steps, each step defining a binary pattern, which defines one equation in a system of simultaneous equations for the amplitudes of the wavelength components. This set of simultaneous equations is then solved to yield the intensity for each channel prior to any specific analytical function, an approach which is cumbersome and time consuming.

None of the above approaches is entirely satisfactory. It is, therefore, desirable to provide an improved spectrum analyzer where the above-noted disadvantages are avoided or significantly diminished, in particular, where the encoding and demodulation are both generalized and significantly simplified such that the details of the spectrum analyzer can be rendered to a single application specific hardware component.

SUMMARY OF THE INVENTION

This invention is based on the recognition that system performance can be greatly improved by replacing the slots in the Hadamard disc by dispersed radiation filters that modulate the amplitudes of the wavelength components as digitized replicas of smooth functions which render the encoded wavelength components substantially orthogonal to one another. In this manner, the time consuming practice of solving a system of simultaneous equations is unnecessary to deconvolve the encoded signal. For this purpose, the modulation functions of the dispersed radiation filters are such that they cause the amplitudes of given modulated wavelength components to change between three or more distinct levels of contrast as the modulator is rotated about an axis, the preferred configuration having the largest number of distinct levels of contrast that is practical.

In many practical embodiments, digitized versions or replicas of the smooth functions may be used instead of analog ones while retaining most of the advantages of the invention. The small interference effects caused by digitization can either be ignored, or accounted for and corrected as required by the application. The modulation functions of two dispersed radiation filters for two different channels are considered to be substantially orthogonal to each other when it is possible to differentiate the contribution to the detector signal caused by the wavelength component in one of the two channels from that caused by the wavelength component in the other channel without having to solve a simultaneous system of equations. The definition also allows for a finite number of corrections to compensate for the effects of digitization. As explained below, for different applications, this definition may be applied differently. In this manner, the time required to decode the amplitude coefficients is greatly reduced. Furthermore, the modulators can be made with filters specifically adapted for certain analytical functions. If modulators with different characteristics are called for to perform a different analytical function, it is a simple matter to replace the modulator by one with the desired properties without altering the system apparatus. Another advantage of the invention lies in that the dispersed radiation filters of a modulator are at fixed spatial relationship to each other, so that wavelength calibration is reduced in determining the alignment of the dispersed image onto the radius of the disc.

One embodiment of the spectrum analyzer of this invention according to one aspect of the invention comprises a source providing radiation, where the radiation includes a plurality of selected wavelength components. Radiation from the source is collected and focused to form an image dispersed by wavelength onto a plane. A two-dimensional spatial modulator positioned in the plane modulates amplitudes of the wavelength components to encode each component, so that the amplitude of each encoded component is a function of time. Each of the functions has three or more distinct levels of contrast. The encoded beam is collected and directed towards a detector and signals generated by the detector are analyzed. Preferably, at least two of the modulation functions for encoding two corresponding wavelength components are substantially orthogonal, so that the amplitudes of the two encoded components present in the total detector signal may be distinguished from each other without solving a system of simultaneous equations.

Another aspect of the invention and useful for the above-described spectrum analyzer is a two-dimensional spatial radiation modulator adapted to be rotated about an axis. The modulator has a plurality of dispersed radiation filters at different radii from the axis for modulating amplitudes of different wavelength components of an incident radiation beam to encode the beam, so that the amplitude of each encoded component is a function of a rotation angle of the modulator about the axis. Preferably, one or more of the filters has a modulation function that encodes the amplitude of the corresponding component so that the encoded component has three or more distinct levels of contrast over time when the modulator is rotated about the axis. More preferably, the modulation functions are smooth functions or digitized replicas thereof, obtained by rounding up or rounding down to a finite number of levels of contrast, such that the modulation functions of two filters for modulating two different wavelength components are substantially orthogonal.

Another two-dimensional spatial radiation modulator that will be useful for spectral analysis includes a two-dimensional spatial radiation modulator adapted to be rotated about an axis. The modulator has at least one dispersed radiation filter being in the shape of a band surrounding the axis, where the radial position of the band is modulated between two different radii from the axis, such that the center wavelength of the reflected radiation is modulated between two different wavelengths when the modulator is rotated about the axis. Preferably the band is serpentine in shape.

Another two-dimensional spatial radiation modulator useful for spectral analysis is adapted to be rotated about an axis. The modulator has at least one dispersed radiation filter in the shape of a substantially continuous band around the axis, where the band has a width that varies as a function of a rotational angle of the modulator about the axis, to modulate the bandwidth of the reflected radiation.

In another embodiment of the invention, a spectrum analyzer for analyzing a sample comprises a source to provide excitation radiation comprised of a first plurality of wavelength components, and means for collecting and focusing a beam of radiation from the excitation source to form a first image dispersed by wavelength onto a first plane. A first two-dimensional spatial radiation modulator is positioned in the first plane to modulate the amplitude of the first plurality of wavelength components, where such amplitudes are periodically modulated using three or more distinct levels of contrast. The encoded excitation beam is collected and focused onto the sample, causing the sample to emit or scatter a beam of radiation. The emitted or scattered beam of radiation from the sample is collected and focused to form a second image dispersed by wavelength onto a second plane. A second two-dimensional spatial radiation modulator positioned in the second plane modulates the amplitudes of a second plurality of wavelength components in said emitted or scattered beam to encode such beam, where such amplitudes are periodically modulated using three or more distinct levels of contrast. The encoded emitted or scattered beam is collected and focused onto a detector and a time-based signal generated by the detector is analyzed for cross-modulation phenomena.

BRIEF DESCRIPTION OF THE DRAWINGS

FIG. 1A is a schematic side view of a spectrum analyzer to illustrate the preferred embodiment of this invention.

FIG. 1B is a schematic view illustrating a view along the line 1B—1B in FIG. 1A of a portion of the analyzer in FIG. 1A.

FIG. 2 is a top view of a two-dimensional spatial radiation modulator suitable for use in the analyzer of FIG. 1A to illustrate an embodiment of the invention.

FIG. 3A is a graphical plot of a digitized replica of a smooth modulation function of one of the dispersed radiation filters in the modulator of FIG. 2 and an idealized modulation function from which the digitized modulation function of the filter of the modulator in FIG. 2 can be derived. Shown also in FIG. 3 is a digitized modulation function with only three levels of gray scale as a coarse digitized replica of the idealized modulation function of FIG. 3.

FIG. 3B is a plot showing the effects of finite digitization on the nominally orthogonal amplitude wavefunctions, $\sin^2(m\theta+p\pi/4)$. The data points were obtained for a twenty-five channel system, where p=0, and m=1–25.

FIG. 4 is a graphical illustration of the digitized replica of a smooth modulation function of two of the dispersed radiation filters of the two-dimensional modulator of FIGS. 2 and 3 and the elongated dispersed image superposed upon the replicas to illustrate the invention.

FIG. 5 is a top view of a two-dimensional spatial radiation modulator to illustrate a modulator with four dispersed radiation filters for encoding different wavelength components using different modulation functions that are orthogonal to one another.

FIG. 6 is a top view of a two-dimensional spatial radiation modulator illustrating four spatial radiation filters for encoding four different wavelength components using the same modulation function.

FIG. 7 is a top view of a two-dimensional spatial radiation modulator which provides spatial radiation filters in the shape of serpentine bands, each of which is located between two corresponding concentric circles of different radii from the rotation axis to illustrate another aspect of the invention.

FIG. 8 is a top view of a two-dimensional spatial radiation modulator provided with a spatial radiation filter in the shape of a band whose width varies with the rotational angle about the rotation axis to illustrate yet another aspect of the invention.

FIG. 9A is a schematic view of a cross-modulation fluorescence excitation/emission analyzer to illustrate one more aspect of the invention.

FIG. 9B is a view of the analyzer of FIG. 9A along the direction 9B—9B in FIG. 9A.

FIG. 10A is a schematic view of a spectrum analyzer that includes a folding mirror whose position is controllable to illustrate a preferred embodiment of the invention.

FIG. 10B is a schematic view of the spectrum analyzer of FIG. 10A, illustrating in more detail the positioning of the folding mirror and other aspects of the analyzer.

FIG. 10C is a view of a portion of the spectrum analyzer of FIG. 10B along the line 10C—10C in FIG. 10B.

FIG. 11A is a schematic view of an apparatus for making the two-dimensional spatial radiation modulator of this invention.

FIG. 11B is a graphical illustration of the laser intensity that may be employed in the apparatus of FIG. 12A for making the two-dimensional modulator.

For simplicity in description, identical components are labelled by the same numerals in this application.

DETAILED DESCRIPTION OF THE PREFERRED EMBODIMENT

FIG. 1A is a schematic view of a spectrum analyzer to illustrate a preferred embodiment of the invention. As shown in FIG. 1A, spectrum analyzer 20 includes a two-dimensional spatial radiation modulator 22 for modulating radiation from a source 24, which may be a broadband or multiple wavelength source such as a blackbody radiator, an incandescent source, a low-pressure isotope lamp, an x-ray excited sample, a Raman excited sample, a luminescent sample, a dye laser, a semiconductor laser, a glass laser, a gas laser and specifically, a carbon dioxide laser. After the radiation from source 24 has been encoded by modulator 22, the encoded beam is directed towards a detector 26 which provides, in response to the encoded beam, a detector output to an analyzing means such as a computer 28. An input radiation beam from source 24 is preferably passed through an entrance aperture 32 to a folding mirror 34 which reflects the radiation towards a concave diffraction grating (focusing grating) 36 which focuses the radiation onto modulator 22. Grating 36 also diffracts the input beam so that an elongated image dispersed according to wavelength is formed on the modulator. Preferably, the elongated image is formed with its length along a radial direction of the modulator 22 when the modulator is rotated about an axis 40 by means of a motorized platter 42. The dispersed radiation filters in or on modulator 22 encode the different wavelength components in the input beam by selectively reflecting the encoded components towards grating 36. Grating 36 in turn collects, reflects and focuses these components into an encoded beam towards folding mirror 34 which reflects the beam towards an exit aperture 44 to detector 26. Detector 26 detects the total intensity of the different encoded wavelength components in the encoded beam to provide a detector output to computer 28. As will be described below, as taught by this invention, the filters in or on modulator 22 are such that computer 28 can distinguish the intensity contribution of each wavelength component that is encoded by modulator 22, without having to solve a simultaneous system of equations. Computer 28 includes a demodulation algorithm 400a, analyzer 400d and output 999. A sample cell (not shown) may be placed between the exit aperture 44 and the detector 26 for analysis of the sample in the cell.

FIG. 1B is a view of the entrance and exit apertures 32, 34 along the arrow 1B—1B in FIG. 1A. Also shown in FIG. 1A is an xyz axis, so that the view along the arrow 1B—1B is along the negative x axis.

FIG. 2 is a top view of a spatial radiation modulator with four different spatial radiation filters thereon to illustrate an embodiment of the invention. As shown in FIG. 2, modulator 22a includes four spatial radiation filters 50a, 50b, 50c and 50d. These filters may be formed as a layer of radiation reflective material on top of a non reflective substrate; alternatively, these filters may be formed as radiation transmissive areas in an opaque substrate, For convenience in description, the spatial radiation filters are described to reflect radiation, it being understood that spatial radiation filters that transmit instead of reflect radiation may be used instead in each of the embodiments herein and such variations are within the scope of the invention.

In the preferred embodiment, filters 50a–50d have digitized modulation functions that are the digitized approximations or replicas of the function $\sin^2(m\theta+p\pi/4)$, wherein m is a positive integer and p can take on any one of the values 0, 1, 2 and 3. Filter 50a, for example, is a digitized approximation of the modulation function $\sin^2\theta$, filter 50b that of modulation function $\sin^2(\theta+\pi/4)$, filter 50c that of $\sin^2(\theta+\pi/2)$ and filter 50d that of $\sin^2(\theta+3\pi/4)$. Thus, the reflectance or transmittance of each of the dispersed radiation filters 50a–50d varies as a function of the rotational angle $\theta$ around the rotational axis 40.

One possible digitized approximation 50 to the $\sin^{2\theta}$ function is illustrated in FIG. 3A. Thus, the modulation function of each of the filters 50a–50d may be illustrated by the digitized modulation function 50 at 20 levels of gray scale. In general, the more levels of gray scale the closer is the digitized approximation to the idealized modulation function $\sin^2\theta$ which is shown in dotted line 50'. Obviously, other digitized approximations of the idealized function 50' may be employed and are within the scope of the invention. The digitized approximations are adequate when it is possible to differentiate the contribution to the detector signal caused by the various wavelength components without having to solve a simultaneous system of equations, and may include a small but finite number of corrections to compensate for the effects of digitization.

FIG. 3B is a plot showing the effects of finite digitization on the nominally orthogonal amplitude wavefunctions, $\sin^2(m\theta+p\pi/4)$. The data points were obtained for a twenty-five channel system, where p=0, and m=1–25. A difference in the decoded amplitudes is defined by normalizing the twenty-five amplitudes to unity, decoding the amplitudes a first time, and then varying the amplitude of a single channel and decoding the amplitudes a second time. The average output error is given by the sum of the absolute difference in the first and second decoded amplitudes divided by the number of channels. In the figure, 61a, 61b and 61c are the resulting errors for varying the amplitude of the fundamental, m=1, the first harmonic, m=2, and the second harmonic, m=3 by +/−100%. The error for the m=11 term is also shown by 61d. The figure clearly illustrates the effects of finite digitization on the orthogonality of the modulation wavefunctions. Low end applications may only require 3–10 levels of contrast to meet a given accuracy specification, but high end systems, where significant accuracy is required may require 20 or more levels of contrast. For the most demanding applications, the first-order correction described below may be used to correct the decoded amplitudes for the interference.

As noted above, many of the advantages of the invention stem from the fact that it is possible to decode the detector signal to obtain the respective amplitudes of two or more wavelength components without having to solve a simultaneous system of equations. However, whether one has to solve a simultaneous system of equations depends on the accuracy that is required for the particular analytical function and application desired. Thus, for some applications requiring very high accuracy, it may be useful to define substantial orthogonality as follows. The modulation functions of two dispersed radiation filters may be considered to be substantially orthogonal to each other when the following conditions are satisfied:

1) the error in the decoded amplitude of the first channel caused by changing the output of the second channel by 100% in either direction is less than one part in $10^{-3}$ after applying the first-order correction as described below.
2) the error in the decoded amplitude of the second channel caused by changing the output of the first channel by 100% in either direction is less than one part in $10^{-3}$ after applying the first-order correction as described below.

FIG. 4 is a graphical illustration of the elongated wavelength dispersed image 52 focused by grating 36 of FIG. 1A superimposed onto the modulation function 50 of FIG. 3A to illustrate the invention. As shown in FIG. 4, the elongated dispersed image 52 is dispersed along the x axis so that its length 52a is parallel to the x axis. The different components having different wavelengths dispersed along the length 52a are shown by different crosshatching in FIG. 4. As the modulator 22a is rotated about axis 40 as shown in FIGS. 1A and 2, the elongated image 52 is focused onto different portions of the filters 50a and 50b. For simplicity, only filters 50a and 50b are shown in FIG. 4. Thus, as the modulator 22a is rotated, image 52 is focused onto different portions of filters 50a, 50b with modulation function 50 of FIG. 3A. Therefore, depending upon which portion of the filter 50a, Sob that image 52 is focused onto, the amount of reflectance of such wavelength components will differ and change over time. As also shown in FIG. 3A, the intensity distribution 52' across the width and at a particular wavelength of the image 52 superposes a portion of the modulation function 50 of the filter 50a or Sob. In mathematical terms, the convolution of the modulation or encoding functions 50 of filters 50a–50d with dispersed wavelength components in image 52 would give rise to the total signal that is reflected by modulator 22a over time towards the grating 36 which focuses such encoded beam towards the detector 26 as described above in reference to FIG. 1A.

In reference to FIG. 2, image 52 is dispersed by wavelength along a radial axis with respect to the rotation of modulator 22a about axis 40, where the radial direction coincides with the x axis in FIGS. 1A and 4. In one embodiment, the reflectance of filters 50a–50d changes only along the azimuthal direction Θ in FIG. 2 and does not change in the radial direction x. Each of the filters 50a–50d occupies a two-dimensional annular area having a radius and a width. Theoretically, the modulation function of the filters can change in both the radial and azimuthal directions. In the embodiment of FIG. 1, the modulation functions of the filters 50a–50d change only in the azimuthal direction and not in the radial direction. Therefore for simplicity, the width of the filters may be ignored and the modulation functions of the filters along the azimuthal direction regarded as the modulation functions of the two-dimensional filters.

FIG. 5 is a top view of another embodiment 22b of the spatial radiation modulator of FIG. 1A. Modulator 22b is provided with four dispersed radiation filters 50a, 54a, 56a and 58a, where the modulation functions of the four filters are all digitized approximations of the function of the general form $\sin^2(m\theta+p\pi/4)$ described above in reference to modulator 22a of FIG. 2. In filters 50a–50d of modulator 22a of FIG. 2, m has the value 1 for all four filters, whereas p ranges from 0 to 3. In modulator 22b of FIG. 5, however, the filters 50a, 54a, 56a, 58a have the respective m values of 1, 2, 3 and 4 whereas p is 0 for all four filters. In general, the spatial radiation filters of any form in the modulator can be defined by specifying the values for m and p in the expression $\sin^2(m\theta+p\pi/4)$, where m is a positive integer and p can take on any one of the four values 0, 1, 2 and 3. Thus in general, the intensity of the encoded beam detected by detector 26 in FIG. 1A from a spatial radiation modulator such as modulators 22a, 22b or other modulators described in this application can be given in general by the following equation:

$$S(\theta) = \sum_m \sum_p a_{m,p} \sin^2(m\theta + p\pi/4) \qquad (1)$$

where $S(\theta)$ is the intensity detected by the detector 26, and the summations include all of the m and p values corresponding to the filters present in a given modulator design. In equation 1 above, $\alpha_{m,p}$ is the amplitude of the wavelength component that has been encoded by the dispersed radiation filter having a modulation function which is a digitized approximation or replica of $\sin^2(m\theta+p\pi/4)$. This invention permits such amplitudes to be determined without solving a simultaneous system of equations as will be demonstrated below. In the summation process in equation 1, the filters present in a particular spatial radiation modulator may not include filters corresponding to all combinations of m and p values. This is exemplified in the modulator 22a of FIG. 2 where m takes on only the value 1, and in the modulator 22b of FIG. 5 where p takes on the value 0 throughout all the filters. In such event, the amplitude $\alpha_{m,p}$ for filters that are not present in the modulator is simply 0. As a further benefit, this approach enables the use of generalized approaches to the modulation drive system and the demodulation algorithms, which can be efficiently adapted to a specific application. For example, the platter is rotated at a constant frequency (as opposed to being stepped), the demodulation algorithm is compatible with any function defined in equation 1, and the number of identity (m, p and wavelength/bandwidth) of the modulated components, and the specific analytic functions to be performed on the decoded data are defined in application specific software. It is still further preferred that the application specific software be located on one side of the application specific hardware, the patterned disc. The trigonometric function $\sin^2(m\theta+p\pi/4)$ obey the following orthonormal relation.

$$\int_0^{2\pi} d\theta \cos(2m\theta + p\pi/2)\sin^2(n\theta + q\pi/4) = -\frac{1}{2}\pi\delta_{m,n}(\delta_{p,q} - \delta_{p,q\pm 2}) \qquad (2)$$

the amplitudes $\alpha_{m,p}$ of the encoded wavelength components may be determined using the orthogonal properties of the trigonometric functions in accordance with equation 3 below:

$$a_{m,p} = -\frac{2}{\pi} \int_0^{2\pi} d\theta \cos(2m\theta + p\pi/2) S(\theta) \qquad (3)$$

One complication introduced by the use of digitized approximations or replicas of the trigonometric function in the modulators 22a, 22b leads to a ringing phenomena at higher harmonics of the fundamental rotational frequencies and gives rise to interference terms which are proportional to the various amplitudes of the wavelength components in the different channels. However, for sufficiently high numbers of levels of contrast, residual interference can be ignored for many applications. Nevertheless, the orthogonality described by equation 2 and used in equation 3 above is inexact. As a result, it is preferable for the interference terms to be accounted for and the individual amplitudes corrected for the interference resulting from the amplitudes in the other channels, which naturally leads to a series of successively higher-order correction terms:

$$a_{m,p} = a_{m,p}^{(0)} + a_{m,p}^{(1)} + \ldots \quad (4)$$

where the zero-order amplitude coefficients are determined from $$a_{m,p}^{(0)} = -\frac{2}{\pi}\int_0^{2\pi} d\theta \cos(2m\theta + p\pi/2) S(\theta) \quad (5)$$

The first-order correction is given by $$a_{m,p}^{(1)} = \sum_n{}' \sum_q{}' A_{n,q}^{m,p} a_{n,q}^{(0)} \quad (6)$$

where the primes on the summations indicate that the term where m=n and p=q is excluded.

The matrix elements $A_{n,q}^{m,p}$ are determined by sequentially decreasing or enhancing the amplitudes of the $\alpha_{n,q}$ and measuring the changes in $\alpha_{m,p}^{(0)}$. For example, if we identify $\delta\alpha_{m,p}^{(0)}$ as the change in $\alpha_{m,p}^{(0)}$ resulting from the change $\Delta\alpha_{n,q}^{(0)}$ the imposed change in $\alpha_{n,q}^{(0)}$, the corresponding matrix element is given by $$A_{n,q}^{m,p} = \frac{\delta a_{m,p}^{(0)}}{\Delta a_{n,q}^{(0)}} \quad (7)$$

In practice, the integral shown in Equation 5 is replaced with a discrete summation over the number of steps M per rotation. On start-up, a three dimensional trigonometric look-up table, $T_{m,p}^j$ is defined and initialized with the values of $\cos(2m\theta + p\pi/2)$ evaluated at the step interval for rotation.

$$T_{m,p}^j \equiv -\frac{2}{\pi M}\cos(j\, m\, 4\pi/M + p\pi/2) \quad (8)$$

The zeroth-order amplitude coefficients are given by a summation of the discrete signal measurements multiplied by the corresponding entry in the trigonometric look-up table $$a_{m,p}^{(0)} = \sum_{j=1}^{M} T_{m,p}^j S(j) \quad (9)$$

where S(j) is the A/D reading from the detector at the jth rotational step. At the end of a complete rotation, the first-order corrections are evaluated if required for a given application:

$$a_{m,p}^{(1)} = \sum_n{}' \sum_q{}' A_{n,q}^{m,p} a_{n,q}^{(0)} \quad (10)$$

Note that if the amplitudes have not changed significantly since the last time the corrections were evaluated, the corrections need not be re-evaluated.

From the description above, it is seen that where M measurements are taken by rotation from 0° through 360° of the modulator, the value of j for the jth rotation step would range from 1 through M. The different combinations of m and p that are present on the modulator corresponding to the actual dispersed radiation filters that are present would give rise to a number N equal to the total number of channels present on the modulator. Upon start-up of the system using a particular modulator, a three-dimensional trigonometric look-up table $T_{m,p}^j$, is then constructed using equation 8 above. In order to obtain the first-order correction, the amplitude $\alpha_{n,q}$ of the channel having a modulation function, which is an approximation of $\sin^2(n\theta+q\pi/4)$, is increased or decreased by $\Delta\alpha_{m,p}^{(0)}$ and the changes in the amplitude $\alpha_{m,p}^{(0)}$ is detected. Thus, if the change introduced in amplitude $\alpha_{n,q}$ is $\Delta\alpha_{n,q}^{(0)}$, the imposed change $\delta\alpha_{m,p}^{(0)}$ caused by such introduction defines the corresponding matrix element $A_{n,q}^{m,p}$, as given by equation 7 above. This process therefore defines a matrix $A_{n,q}^{m,p}$ defined by equation 7. The amplitude $\alpha_{n,q}$ may be altered by simply blocking the radiation that is reflected by the corresponding filter. At the end of a complete rotation, the first-order corrections may then be determined according to equation 10 above.

Thus, upon initialization of the system such as system 20 of FIG. 1A, a N row by M column matrix $T_{m,p}^j$ is calculated and its values stored in a N row by M column matrix look up table. Then when each of the M measurements at M values of θ are obtained when the modulator is rotated from 0 to 360°, M, M being a positive integer and so is N, the computer derives the amplitude of each of the wavelength components (the coefficients $\alpha_{m,p}$ in equation 1) in the N channels by summing the products of each of the M measurements with each of the M entries in the corresponding row in the look-up table for such channel.

FIG. 6 is a top view of a spatial radiation modulator 22c with four dispersed radiation filters therein with the same modulation functions $\sin^2(2\theta)$, but located at different radii from the rotational axis 40 for encoding different wavelength components. This may be useful for the grouping of wavelengths into sub-groups, where the components of such wavelengths are collectively modulated to enhance the signal-to-noise ratio. As shown in FIGS. 2, 5 and 6, the dispersed radiation filters preferably comprise areas in the shape of annular segments at different radii from the rotational axis 40.

FIG. 7 is a top view of another spatial radiation modulator 70 to illustrate another aspect of the invention. As shown in FIG. 7, modulator 70 is provided with three continuous bands 72, 74, 76 which are serpentine in shape. Each of the bands 72, 74, 76 is located between two concentric circles of two different radii from the rotational axis 40. Band 74, for example, is located between two concentric circles 78, 79 at radii r1 and r2 from the rotation axis 40, where the two radii correspond to two different wavelengths $\lambda_1$ and $\lambda_2$. Thus, serpentine band 74 is of such a shape that its path oscillates between the two concentric circles at a modulation frequency given by the equation below:

$$r(\theta)=r1+(r2-r1)*\sin^2(m*\theta) \quad (11)$$

where m is an integer, and θ the rotational angle around the rotation axis 40.

The same is true for bands 72, 76. As will be evident from FIG. 7, band 74 is modulated at a frequency intermediate between the modulation frequencies of bands 72 and 76. Therefore, in the same manner as that described above for demodulation of the different wavelength components for the modulators 22a and 22b in FIGS. 2 and 5 above, the amplitude of the signal at the wavelength $(\lambda_1+\lambda_2)/2$ modulated at a frequency for band 74 between the two wavelengths can be obtained in a similar manner from a single measurement when the modulator is rotated by 360 degrees. By choosing an appropriate modulation frequency, it is possible to obtain the first derivative between $\lambda_1$ and $\lambda_2$, which may be useful for many applications.

FIG. 8 is a top view of yet another spatial radiation modulator 80 to illustrate another aspect of the invention. Modulator 80 is provided with a band 82 having a width that varies as a function of the rotational angle θ around the rotation axis 40 at a selected frequency given by the equation:

$$\Delta r(\theta) = \Delta r1 + (\Delta r2 - \Delta r1) + \sin^2(m\theta) \tag{12}$$

where m is an integer, and θ the rotational angle around the rotation axis 40. The narrowest point is 82b and the widest point of the band is 82a The detected amplitude of the wavelength component encoded by band 82 may be used to adjust the measurement results obtained using modulators 22a, 22b, 22c for correcting errors introduced by imperfections of the different components of the spectrum analyzer.

In the preferred embodiment, the dispersed radiation filters comprises two-dimensional patterns of alternating high and low transmittance or reflectance areas. Such pattern is a practical implementation of the digitized approximation or replica of a smooth periodic function such as the sine squared function. This is analogous to the half-toning process used in printing where black and white printed patterns are used to approximate intermediate gray scale levels. Thus as shown in FIGS. 2, 5 and 6, areas in the dispersed radiation filter with higher reflectance are shown with a higher concentration of black dots whereas areas of the filters with a lower reflectance are shown with fewer dots. As noted above, the black dots in these figures may indicate areas of high transmittance or reflectance, whereas the white background of the disc in such filter areas is substantially non-reflective, non-transmissive or opaque. The size of the dots in these filters defines the size of reflective or transmissive pixels. Instead of using a substrate with low reflectivity or transmission and a patterned layer of high reflectively material on the substrate as described above, (or forming patterned transmissive areas in an opaque substrate), the dispersed radiation filters may be constructed in a different manner. Thus a substrate with moderate reflectivity or transmission may be employed instead, Then in areas of the filters requiring high reflectivity or transmission, an area having such characteristics is formed (by deposit of a reflective layer or formation of transmissive area), and a layer of low reflectivity or translucidity material may be deposited in areas of the filter calling for such characteristics. This is used in a different manner to the rest of the invention. The disc becomes the diffraction grating. The modulators include preferably at least one grating whose diffraction characteristics are functions of radius of the grating and the rotation or position of the grating.

Instead of using patterns of alternating high and low reflectance or transmission, it is also possible to construct the modulators with substantially orthogonal modulation functions that are not digitized but are "analog" in nature. Thus neutral density filters may be used for this purpose, where the filters are formed by sputtering a light reflective material onto a transparent substrate. Depending on the thickness of the material sputtered, the amount of transmission can be controlled to achieve a particular substantially continuous and smooth transmittance function.

Instead of using modulator 70 of FIG. 7 to obtain a first derivative between the wavelengths $\lambda_1, \lambda_2$, the same result may be obtained using the modulator 22a or 22b. The amplitude of the component at a first wavelength $\lambda_1$ encoded according to the function $\sin^2(m\theta + p_1\pi/4)$ and the amplitude of the component at a second wavelength $\lambda_2$ encoded according to the function $\sin^2(m\theta + p_2\pi/4)$ are obtained, where $p_1 - p_2$ is an even integer and $p_1$ and $p_2$ having one of the values 0, 1, 2 and 3. The computer then derives the difference between the modulated amplitudes of the components at $\lambda_1$ and $\lambda_2$ to obtain a first derivative value at $(\lambda_2 + \lambda_2)/2$.

In cross-modulation fluorescence excitation/emission analysis, it is important to be able to lock the phase of the modulation functions used for the excitation beam to the phase of the modulation functions used for the emission beam. Still better, is the ability to control the relative phase between the modulation functions used for the excitation beam to the phase of the modulation functions used for the emission beam. Another aspect of the invention is directed to the recognition that, by placing the appropriate dispersion radiation filters on one side of the disc for encoding the excitation beam and the appropriate filters for emission analysis on the other side of the disc, where the filters on both sides of the disc are spatially correlated, the modulation functions for the excitation and emission modulation processes can be phase-locked and the relative phase controlled in a very simple manner.

FIG. 9A is a schematic view of a cross-modulation fluorescence excitation/emission analyzer 100. An excitation beam 102 from excitation source 104 is reflected by folding mirror 34 and reflected and focused by grating 36 as before towards the filters suitable for encoding the excitation beam on the top side of the modulator 106. After being modulated, the encoded excitation beam is reflected by the modulator 106 back towards the grating 36 which focuses the encoded excitation beam 108 towards a fluorescent sample 110 after reflection by mirror 34. The fluorescent beam 112 emitted by the sample in response to the encoded excitation beam is reflected by mirror 34' toward a second grating 361 which disperses and focuses the beam towards dispersed radiation filters adapted for fluorescence encoding present on the bottom side of modulator disc 106. After being modulated, the encoded fluorescent beam 118 is reflected, collected and focused by grating 36' towards a detector 120 after reflection by mirror 34'. As indicated in FIG. 9A, the fluorescent sample 110 is in the plane of the page or paper, the excitation source 104 is displaced into the page and the fluorescence detector 120 is displaced out of the page. The side view of analyzer 100 along the arrows 9B—9B in FIG. 9A is illustrated in FIG. 9B. As before, a computer 28 (not shown) connected to detector 120 is used to analyze a time-based signal generated by the detector. The patterns on the top side of disc 106 for encoding the excitation beam may have a pattern that is a digitized replica of $\sin^2(m\theta + p\pi/4)$ and that for encoding the emission beam is a digitized replica of $\sin^2(m\theta + p\pi/4)$ where m, n, p, q are positive integers. Computer 28 may then analyze the detector output to determine the amplitude of sum and difference frequency terms resulting from phase-locked cross-modulation according to the general trigonometric relation:

$$\sin^2(M\theta + \pi/4) * \sin^2(n\theta + q\pi/4) = (\frac{1}{8}*/\{\cos[2(m+n)\theta + (p+q)\pi/2] + \cos[2(m-n)\theta + (p-q)\pi/2]\} \tag{13}$$

In order to permit phase locking of the modulation functions of the filters on the top and bottom sides of disc 106, timing marks are provided that can be used for both sides of the disc. This is illustrated more clearly in FIGS. 2, 5 and 6. As shown in all three figures, timing marks 150 at regular angular intervals in reference to axis 40 are provided on a circle near the circumference of the disc 22a, 22b or 22c and a timing mark 152 is provided at a non-regular angular interval or position to mark the zeroth degree rotation angle. As shown in FIG. 1A, a radiation source 154 provides abeam towards the location of time marks 150, 152 of the discs 22a, 22b, 22c and a photodetector 156 on the other side of the disc is positioned to detect the radiation beam provided by source 154. In the preferred embodiment, the substrate is transmissive to the timing beam and timing marks obstruct timing beam alternately, the substrate is opaque to the timing signal and timing marks are milled or etched through substrate. Therefore, the output of photodetector 156 may supply through a connection (not shown) to computer 28 to mark the zero rotational angle and to also mark the instances of the passage of each of the timing marks 150. Such instances may be utilized by computer 28 for taking the M samples when the disc is rotated from 0 to 360°. The above-described scheme for cross-modulation of excitation and emission can also be applied to cross-modulation of excitation and scattering. For this purpose, the fluorescent sample 110 is replaced by a sample that scatters the excitation beam. The scattered beam is then encoded and measured in the same manner as the emission beam described above. The above scheme using the timing marks 150, 152, source 154, photodetector 156 may also be used for controlling the timing of the taking of samples in other embodiments of this invention.

In reference to FIGS. 9A, 9B, the same timing marks and radiation source/photodetector system (not shown) described above may be employed in analyzer 100 for performing the encoding of the excitation beam and of the emission/scattered beam by reference to the same timing marks on the same disc.

FIG. 1A is a schematic view of a spectrum analyzer where the position of a folding mirror may be controlled to compensate for alignment and other errors in the system. Thus as shown in FIG. 1A, where the folding mirror is in position 34(1), the input beam 202 is not properly focused onto the modulator 22. For this purpose, the folding mirror 34 is connected to a translation-rotation stage controlled by a controller for moving the folding mirror to position 34(2), so that input beam 202' is properly focused onto the modulator 22. FIG. 10B is a schematic view of an analyzer with the translation stage and the feedback mechanism used for controlling the position of the folding mirror to dynamically align the system. The folding mirror is mounted on a stage which facilitates translations along the x axis and rotations about the y axis. The background dielectric spectra for various configuration of the folding mirror has been previously analyzed and recorded into software. The real-time background dielectric spectrum is compared with the stored spectra to gauge the misalignment of the dispersed image on the modulator. This information is transformed into a command set which is sent to the translation stage to reposition the folding mirror. The process is repeated as necessary for a given application. In reference to FIGS. 1A, 10B, the output of the detector 26 is sampled and then demodulated by demodulation algorithm 400a, compared to background dielectric spectrum 400b by comparator 400c, and then analyzed by analyzer 400c. Hardware driver 401 positions the folding mirror 34 in response to instructions from computer 28.

FIG. 11A is a schematic view illustrating an instrument for making the spatial radiation modulators 22, such as modulators 22a–22c described above. For this purpose, a curing/ablation laser 250 is used. A photoresist 252 is placed on top of a gold coated substrate. The photoresist and the substrate are both rotated and the signal supplied to the laser is controlled in accordance with a predetermined laser intensity data shown in FIG. 11B. After the photoresist has been so exposed, the gold coated substrate may be processed in a conventional manner to form the patterns of alternating high and low reflectance and/or transmissivity on the gold coated substrate to form the spatial radiation modulators.

While the invention has been described above by reference to various embodiments, it will be understood that different changes and modifications may be made without departing from the scope of the invention which is to be defined only by the appended claims (including the specific placement of a sample cell in the beam path.

What is claimed is:

1. A two dimensional spatial radiation modulator adapted to be rotated about a rotation axis to modulate at least two components of an incident radiation beam to encode said beam, said modulator comprising at least two radiation filters forming a filter pair and located at different radii from said rotation axis, each of the filters modulating intensity of a corresponding one of said two components as one of two modulation functions of a rotation angle of the modulator about said rotation axis, said two functions being out of phase but having substantially the same fundamental frequency.

2. The modulator of claim 1, said two functions being substantially 180 degrees out of phase.

3. The modulator of claim 1, wherein the at least two filters have substantially orthogonal modulation functions.

4. The modulator of claim 1, wherein said modulation functions are digitized replicas of substantially smooth functions, said digitized replicas having three or more substantially distinct levels of contrast.

5. The modulator of claim 1 wherein at least one of said filters modulates the intensity of a component substantially according to digitized replicas of the function $\sin^2(m*\theta+p\pi/4)$, where $\theta$ is the rotation angle of said modulator, and m and p are integers.

6. The modulator of claim 5, wherein at least one of said filters modulates the intensity of a first component substantially according to digitized replicas of said function $\sin^2(m*\theta+p_1\pi/4)$, and another one of said filters modulates the intensity of a second component substantially according to digitized replicas of the function $\sin^2(m*\theta+p_2\pi/4)$, where $p_1-p_2$ is an even integer.

7. A two dimensional spatial radiation modulator adapted to be rotated about a rotation axis to modulate at least two components of an incident radiation beam to encode said beam, said modulator comprising at least two radiation filters forming a filter pair and located at different radii from said rotation axis, each of the filters modulating intensity of a corresponding one of said two components as one of two modulation functions of a rotation angle of the modulator about said rotation axis, said two functions being substantially the same, so that sum of the amplitudes of the resulting modulated components is determined by sum of radiation from said beam incident on the at least two filters.

8. The modulator of claim 7, wherein at least two of said filters collectively modulate the intensities of at least two different components substantially according to a function $\sin^2(m*\theta+p_1\pi/4)$.

9. The modulator of claim 7, wherein said modulation functions are digitized replicas of substantially smooth functions, said digitized replicas having three or more substantially distinct levels of contrast.

10. The modulator of claim 7, wherein at least one of said filters modulates the intensity of a component substantially according to digitized replicas of the function $\sin^2(m*\theta+p\pi/4)$, where e is the rotation angle of said modulator, and in and p are integers.

11. A radiation spectrum analyzer comprising:

at least one source providing radiation having spectral components, each of said spectral components baying an intensity;

first optics collecting, dispersing and focusing said radiation to form an image dispersed by wavelength along an encoding axis onto a plane, said first optics comprising an optical dispersive element;

a two dimensional spatial radiation modulator rotated about a rotation axis and positioned substantially in said plane so that said encoding axis is substantially along a radial axis, said modulator having at least two radiation filters at different radii from said rotation axis, said filters modulating the intensity of different corresponding spectral components dispersed along the encoding axis;

a detector;

second optics collecting the spectral components modulated by the at least two radiation filters to provide an encoded beam said directing said encoded beam onto said detector, causing the detector to provide an output signal, said second optics comprising the dispersive element; and a computer analyzing the out signal.

12. The analyzer of claim 11, wherein said dispersive element comprises a diffraction grating.

13. The analyzer of claim 11, wherein said detector provides a single output signal in response to the spectral components modulated by the at least two radiation filters.

14. A method for analyzing radiation spectrum comprising:

providing radiation having spectral components, each of said spectral components having an intensity;

collecting, dispersing and focusing said radiation to form an image dispersed by wavelength along an encoding axis onto a plane by means of first optics comprising an optical dispersive element;

providing a two dimensional spatial radiation modulator rotated about a rotation axis and positioned substantially in said plane so that said encoding axis is substantially along a radial axis, said modulator having at least two radiation filters at different radii from said rotation axis, said filters modulating the intensity of different corresponding spectral components dispersed along the encoding axis;

collecting the spectral components modulated by the at least two radiation filters to provide an encoded beam and directing said encoded beam onto a detector, causing the detector to provide an output signal by means of optics comprising the dispersive element; and analyzing the out signal.

* * * * *